United States Patent [19]

Sharon, Jr. et al.

[11] Patent Number: 5,893,111
[45] Date of Patent: Apr. 6, 1999

[54] AD TAKING PAGINATION INFORMATION SYSTEM

[76] Inventors: Paul A. Sharon, Jr., 224A Mechanic St., Marlborough, Mass. 01752; James H. Fitch, Jr., 493 Arborway #26, Jamaica Plain, Mass. 02130

[21] Appl. No.: 876,007

[22] Filed: Jun. 13, 1997

[51] Int. Cl.$^6$ .................................................. G06F 17/30
[52] U.S. Cl. .......................................... 707/104; 707/100
[58] Field of Search ..................... 707/100, 101, 707/104, 103, 5, 10; 235/375

[56] References Cited

U.S. PATENT DOCUMENTS

| | | | |
|---|---|---|---|
| 4,792,968 | 12/1988 | Katz | 379/92 |
| 4,816,824 | 3/1989 | Katz et al. | 340/825.34 |
| 4,845,739 | 7/1989 | Katz | 379/92 |
| 4,922,520 | 5/1990 | Bernard et al. | 379/88 |
| 4,930,150 | 5/1990 | Katz | 379/93 |
| 4,932,046 | 6/1990 | Katz et al. | 379/32 |
| 4,939,773 | 7/1990 | Katz | 379/204 |
| 4,987,590 | 1/1991 | Katz | 379/204 |
| 5,014,298 | 5/1991 | Katz | 379/93 |
| 5,016,270 | 5/1991 | Katz | 379/92 |
| 5,048,075 | 9/1991 | Katz | 379/92 |
| 5,073,929 | 12/1991 | Katz | 379/93 |
| 5,091,933 | 2/1992 | Katz | 379/204 |
| 5,109,404 | 4/1992 | Katz et al. | 379/88 |
| 5,128,984 | 7/1992 | Katz | 379/92 |
| 5,185,787 | 2/1993 | Katz | 379/204 |
| 5,218,631 | 6/1993 | Katz | 379/88 |
| 5,224,153 | 6/1993 | Katz | 379/93 |
| 5,251,252 | 10/1993 | Katz | 379/92 |
| 5,255,309 | 10/1993 | Katz | 379/88 |
| 5,259,023 | 11/1993 | Katz | 379/88 |
| 5,297,197 | 3/1994 | Katz | 379/204 |
| 5,349,633 | 9/1994 | Katz | 379/88 |
| 5,351,285 | 9/1994 | Katz | 379/94 |
| 5,359,645 | 10/1994 | Katz | 379/93 |
| 5,365,575 | 11/1994 | Katz | 379/92 |
| 5,412,708 | 5/1995 | Katz | 348/14 |
| 5,442,688 | 8/1995 | Katz | 379/156 |
| 5,495,284 | 2/1996 | Katz | 348/15 |
| 5,553,120 | 9/1996 | Katz | 379/88 |
| 5,561,707 | 10/1996 | Katz | 379/88 |
| 5,740,549 | 4/1998 | Reilly et al. | 705/14 |
| 5,742,675 | 4/1998 | Kilander et al. | 379/265 |
| 5,768,356 | 6/1998 | McKendry et al. | 379/201 |

Primary Examiner—Paul Linte
Assistant Examiner—Ella Colbert
Attorney, Agent, or Firm—Nutter, McClennen & Fish, LLP

[57] ABSTRACT

A network on which personal ads are stored for distribution to a client includes at least one call center on which the personal ads are entered, at least one ad response machine on which responses to the ads are stored and an ad taking system including a processor and a database. The database includes an identifier of each client, the text of the personal ads to be distributed to each client and a profile of each client. The client profile includes a list of personal ad parameters and a weight associated with each such parameter. Ads are distributed to the client in an order based on the weight assigned to each parameter applicable to the ad. In accordance with one aspect of the invention, the weights are verified with statistics of the productivity of recently published ads in eliciting responses, with such statistics being obtained over the network from an ad response machine servicing the client. In accordance with a further aspect of the invention, at least one box pool for each client is stored in the database and includes box numbers and security codes available for advertisers to access ad responses and the processor is operative to ensure that a predetermined minimum number of box numbers and security codes remain available for each client.

18 Claims, 9 Drawing Sheets

| CLIENT #1 ─ 170₁ | ADS 174₁ | ADVERTISER #1; AD #1; POINTS #1; CATEGORY #1; SUBSCRIBER #1; SURVEY #1; ASSIGNED BOX #1 AND SECURITY CODE #1 ... ADVERTISER #n; AD #n; POINTS #n; CATEGORY #n; SUBSCRIBER #n; SURVEY #n; ASSIGNED BOX #n AND SECURITY CODE #n |
| --- | --- | --- |
| | BOX POOL #1 178₁₁ | BOX #1; SECURITY CODE #1; CUTOFF DATE #1 ... BOX #P; SECURITY CODE #P; CUTOFF DATE #P |
| | ... | |
| | BOX POOL #m 178₁ₘ | BOX #1; SECURITY CODE #1; CUTOFF DATE #1 ... BOX #v; SECURITY CODE #v; CUTOFF DATE #v |
| | PROFILE 182₁ | MINIMUM REORDER POINT/BOX POOL; REORDER QTY ─ 184 FONT, PITCH, FREE PAGE SPACE ─ 186 AD PARAMETER #1; POINTS #1 ⎫ ... ⎬ ─ 190 AD PARAMETER #Q; POINTS #Q ⎭ |
| ... | ... | ... |
| CLIENT #X ─ 170ₓ | | |

AD TAKING PAGINATION INFORMATION SYSTEM

CROSS-REFERENCE TO RELATED APPLICATIONS

Not applicable.

STATEMENTS REGARDING FEDERALLY SPONSORED RESEARCH

Not applicable.

BACKGROUND OF THE INVENTION

Advertisements placed by individuals seeking to meet other individuals are often referred to as personal ads, or "personals". Various types of publications print personals, including newspapers and magazines. The method by which a personal ad is placed and/or responded to can vary. For example, a telephone system may be employed to place ads which are then printed in a newspaper or magazine. Responses to personals may be telephone responses in the form of recorded voice messages which are stored for retrieval.

Some publications (referred to herein as the "client") enlist the services of another organization (referred to herein as the "vendor"), such as Tele-Publishing, Inc., the Assignee of the subject invention, for the purpose of collecting and processing personal ads and providing the text of the ads in a convenient form for publication. The vendor operates a plurality of computers, referred to as call centers, to which telephone access is provided. A call center operator, or ad taker, answers telephone calls from individuals seeking to place ads (referred to herein as "advertisers") and enters the text of the personal ads onto the computer, along with other information, such as information identifying the advertiser.

In one system in which responses to personal ads are recorded voice messages, the vendor maintains a plurality of computers (referred to herein as ad response machines) on which the responses are recorded on a voice recording media. The ad response machines are located remotely relative to the vendor and more locally with respect to the clients in order to reduce the cost of placing telephone call responses. The ad taker provides the advertiser with a box, including a box number and a security code, with which telephone access to the responses is achieved. More particularly, the box number identifies a portion of the voice recording media on which responses to the advertiser's personal ad are stored and the security code ensures that the party accessing such responses is authorized to do so.

Conventionally, a predetermined number of boxes are initially allotted for ads placed for publication by each client and, when the number of available boxes falls below a predetermined level, vendor personnel call the ad response machine servicing the client to download additional box numbers and security codes via a modem. The new box numbers and security codes are then entered onto a computer for future use. However, this technique disadvantageously requires frequent monitoring of the number of boxes available for each client and is susceptible to errors which may occur in transcribing the box numbers and security codes onto the computer.

The vendor accumulates a number of personal ads and provides the text of the ads to the client in a convenient form, such as on a computer diskette or a hard copy. Some clients request the "raw text" of the accumulated personals, with little or no processing by the vendor. Other clients have the vendor process the text of the ads and provide the ads in a format and order ready to print (i.e., "camera ready"). Such processing generally includes determining the number of ads to provide for printing in the space allocated by the client and the optimum order in which to print of the ads on the basis of which ads are most likely to elicit responses. Ordering ads in this manner is advantageous since revenue is based on the number and duration of responses placed with "900" calls.

In sorting and ordering personal ads based on their likelihood of response, typically a vendor account executive relies on experience as to which types of ads (i.e., categories of ads and parameters applicable to the ads) historically obtain the most responses when published by the particular client. However, this task is significant in view of the number of clients serviced by the vendor, the frequency with which ads are delivered to the client, the number of different ad categories and possible ad parameters and the frequency with which changing demographics and other factors cause changes in the success of certain types of ads. The account executive may additionally request from the ad response machine "minutes reports" which are printed reports listing the number of minutes that each box is accessed and use such reports in determining which ad types have the greatest likelihood of response. However, the usefulness of such minutes reports in optimizing the order of presentation of ads varies based on the time lapse between issuance of such reports and production of the personal ad text and, further, by the fact that the number of minutes that a box is accessed is not always an accurate indication of the number of responses received.

BRIEF SUMMARY OF THE INVENTION

The invention relates to a network on which personal ads are stored for distribution to one or more clients. The network includes at least one call center on which personal ads are entered, at least one ad response machine on which responses to the personal ads are stored and an ad taking system comprising a database. The database includes an identifier of each client, the text of the personal ads to be distributed to each client and a profile of each client for use in distributing personal ad text to the client. The profile contains a list of personal ad parameters and a weight associated with each of the listed parameters. In accordance with one feature of the invention, the weights are verified with statistics of the productivity of the respective personal ad parameter in eliciting responses and the statistics are obtained from the ad response machine over the network based on previously published ads. The weights are used in ordering personal ads for distribution to the client in an optimum manner, according to the ad's likelihood of eliciting responses.

With this arrangement, statistical information regarding ads recently published by the client is used to order ads for distribution in a manner which ensures that subsequent ads distributed to the client are those most likely to elicit responses. This arrangement is contrasted to, and overcomes drawbacks associated with the conventional technique of a vendor account executive relying on experience and/or minutes reports in ordering personals for publication.

In accordance with a further aspect of the invention, a method for providing text of personal ads to a client includes calculating a point total to assign to each of the personal ads in accordance with a weighting scheme associated with the client and ordering the personal ads according to their point totals. A maximum quantity of text to be provided to the client is determined based on a profile of the client and the personal ad text is provided to the client in accordance with the determined maximum text quantity and the point totals of the personal ads. In one embodiment, the weighting scheme includes a weight value assigned to each ad parameter and the profile includes attributes of the client publication, such as character font, pitch and free page space allocated for printing personal ads.

Providing the text of personal ads to a client in this manner advantageously ensures that the optimum order and number of ads are provided. The personal ad order is optimized to give priority to those ads eliciting the most responses. The described technique of determining a maximum text quantity to provide to the client based on attributes of the client publication advantageously eliminates problems which can arise if too much or too little text is provided. For example, if too much personal ad text is provided to the client, then some of the provided ads will not be published and an accurate feedback mechanism is required to ensure that such "returned" ads are later published.

In accordance with a still further aspect of the invention, the database of the ad taking system contains at least one box pool for each client in which is stored box numbers corresponding to a portion of voice recording media of an ad response machine and security codes by which authorized access to the voice recording media is verified. More particularly, an advertiser who calls into a call center to place a personal ad receives a box number and a security code with which to access voice message responses recorded on the ad response machine. The processor is operative to ensure that a predetermined minimum number of boxes (i.e., box numbers and security codes) are stored in the database for each box pool of each client. In one embodiment, a value stored in the client profile portion of the ad taking system database represents the predetermined minimum number of boxes to be stored and available for each client. A further value stored in the profile represents the number of boxes to be ordered each time the available number of boxes is less than the predetermined minimum number.

With this arrangement, an effective box management technique is provided for ensuring that a predetermined minimum number of boxes remains available for each client. The decision as to whether to order more box numbers and security codes is made automatically, by the processor and is further made periodically, at a rate sufficient to prevent the number of boxes in reserve from decreasing to a point where new ads can no longer be placed. Further, the number of new boxes ordered is tailored to the client's needs and usage, thereby avoiding unnecessarily tying up box numbers and security codes.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
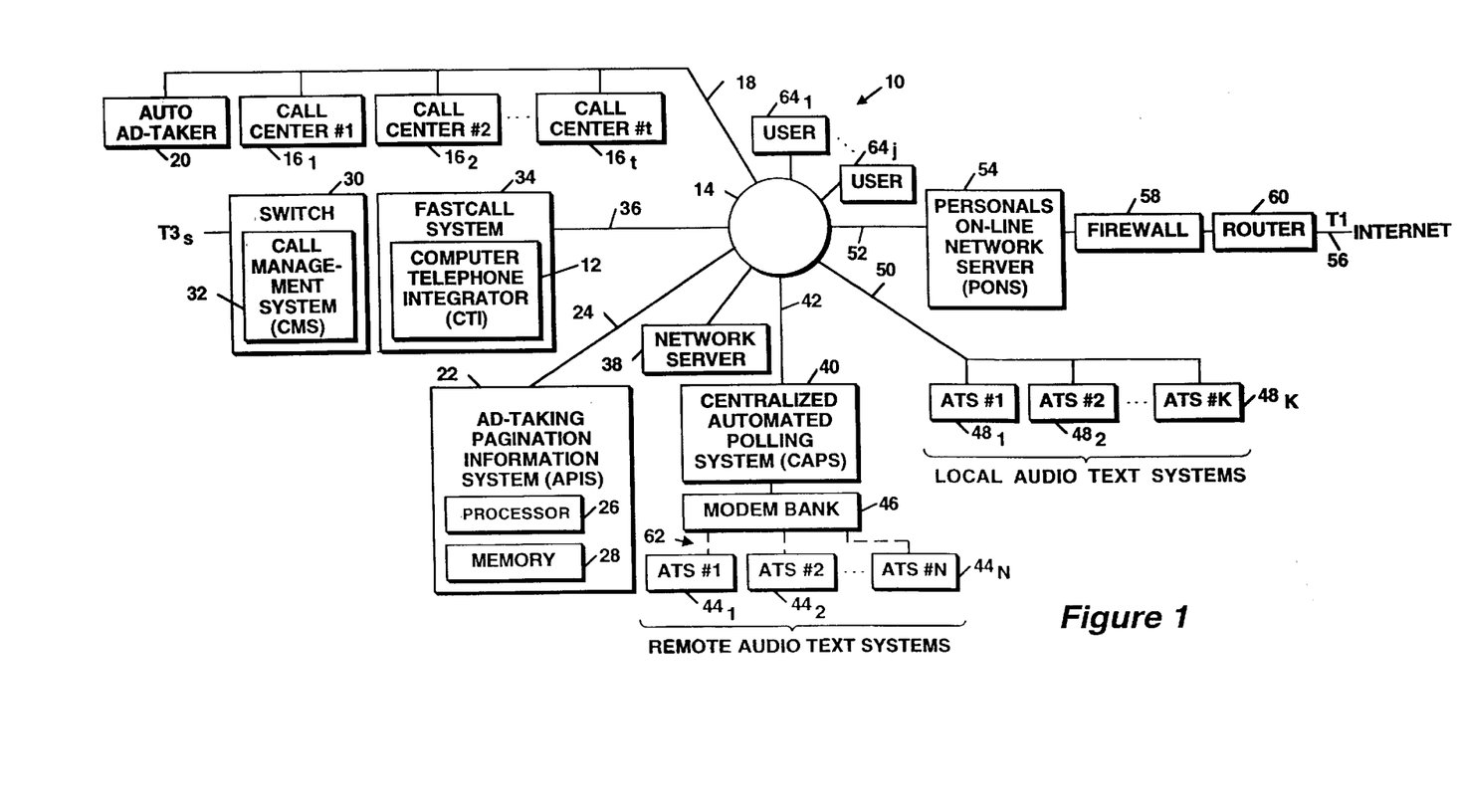
FIG. 1 is a block diagram of a network for placing and responding to personal ads including an ad taking pagination information system according to the invention.

Referring to FIG. 1, a network 10 is shown for receiving personal advertisements ("personals"), storing the personals and storing responses to the personals. While the present invention is described with particular reference to apparatus and methods for processing personal ads, it will be appreciated by those of ordinary skill in the art that various text can be processed by the apparatus and techniques described and claimed herein. Further, the particular network apparatus and architecture is illustrative only and can be varied without departing from the spirit of the invention.

The network 10 is used by a vendor to collect, store, process and distribute personals to one or more clients for publication and to store responses to the published ads. The network 10 includes a vendor network 14 which, in the illustrative embodiment, is a Local Area Network (LAN) 14.

A plurality of call centers $16_1$–$16_t$ for receiving personal ads via telephone lines are coupled to the vendor network 14 via a communication link 18, such as an Ethernet link. Each of the call centers $16_1$–$16_t$ includes a telephone line and a computer, such as a personal computer or workstation, at which an operator, or ad taker is stationed. The ad taker answers telephone calls from individuals seeking to place personal ads (i.e., advertisers) and enters information gathered from the advertisers onto the call center computer. Each ad taker has a particular set of skills which, for example, may include an ability to speak a foreign language or specialized training in taking ads for a particular client. Calls are routed to a call center at which the ad taker is qualified to answer the particular call.

When an operator answers a telephone call, one or more ad taking screens appear on the display of the call center computer. The ad taking screens include a field identifying the client for which the ad is being placed and, further, include a plurality of fields that the ad taker completes in response to information provided by the advertiser. As examples, the advertiser provides and the ad taker enters the advertiser's name, address, telephone number, e-mail address (if any), category of the ad sought to be placed (e.g., female seeking male), text of the ad and answers to certain survey questions that the ad taker may ask. The survey questions may be developed by, and for the benefit of the vendor and/or the client.

Also coupled to the communication link 18 is an automated ad taker 20 by which personal ads can be placed via an automated telephone system. A caller to the automated ad taker 20 is prompted by a voice recording to answer a series of questions. The caller's answers are recorded and later transcribed onto ad taking screens of a call center computer.

Personal ads placed via the call centers $16_1$–$16_t$ or the automated ad taker 20 are stored in a database of an Ad Taking Pagination Information System (APIS) 22, referred to alternatively as an ad taking system, which is coupled to the vendor network 14 via a communication link 24, such as an Ethernet link. More particularly, APIS 22 includes a memory 28 in which the database is stored and a processor 26 on which one or more programs are executed for managing certain operations of the network 10, as will be described. In the illustrative embodiment, APIS 22 is implemented on an Alpha computer of Digital Equipment Corporation.

Also coupled to the vendor network 14 are a telephone switch 30 including a Call Management System (CMS) 32 and a Fastcall system 34 including a Computer Telephone Integrator (CTI) 12, both of which are products available from AT&T. The switch 30 is coupled between the Fastcall system 34 and a plurality of telephone lines, such as T3 lines, and routes the calls through the Fastcall system 34 to an appropriate one of the call centers $16_1$–$16_t$, via network communication links 36, 18 as will be described. The Fastcall system 34 functions as an interface between the switch 30 and the network 14.

A plurality of local Audio Text System (ATS) machines $48_1$–$48_K$ are coupled to the vendor network 14 via a communication link 50, such as an Ethernet link. A plurality of remote ATS machines $44_1$–$44_N$ are coupled to the vendor network 14 via a first communication link, such as an Ethernet link 42, a Centralized Automated Polling System (CAPS) 40, a modem bank 46 and a plurality of telephone lines 62, as shown. The ATS machines permit telephone responses to personals published by the vendor's clients to be recorded, stored and accessed by the advertiser. Each of the ATS machines $44_1$–$44_N$ and $48_1$–$48_K$ includes a telephone interface to Plain Old Telephone Service (POTS) lines and T1 lines (not shown) through which personals responses are placed and accessed, a processor and media for recording and storing voice messages. In the illustrative embodiment, responses to ads are placed by calling a "900" number.

The voice recording media of each ATS machine is partitioned into a predetermined number of sectors (referred to as boxes), with each such box being telephone accessible by entering a number assigned to the box (i.e., a box number) and a corresponding security code. Associated with each box is a start date which indicates when the box is available and an end date which indicates when the box is no longer available.

The ATS machines $48_1$–$48_K$ are local in the sense of being located in relatively close proximity to the vendor and the ATS machines $44_1$–$44_N$ are remote in the sense of, generally, being located a significant distance from the vendor. Each of the remote ATS machines $44_1$–$44_N$ is located proximal to one or more of the vendor's clients, thereby enabling responses to personals to be made with less expensive telephone calls. In the illustrative embodiment, there are on the order of thirteen local ATS machines $48_1$–$48_K$ and on the order of eighty remote ATS machines $44_1$–$44_N$. However, it will be appreciated by those of ordinary skill in the art that the number of ATS machines, both local and remote, is a function of the number of clients serviced by the vendor, their geographic locations and the capability of each ATS machine.

The CAPS 40 communicates with the local ATS machines $48_1$–$48_K$ and the remote ATS machines $44_1$–$44_N$ for the purpose of obtaining certain statistical information from the ATS machines. Such statistical information includes, for each ad placed, a list of parameters applicable to the ad and is used to verify a profile of the client used in text production, as described further in conjunction with FIGS. 6, 7 and 7A. Production refers to the accumulation and processing of personal ad text by the vendor and distribution of such text to a client. The client profile includes a list of various ad parameters and a corresponding weight assigned to each listed parameter, as will be discussed. CAPS 40 polls local and remote ATS machines at predetermined times (i.e., scheduled polling) as a function of the timing of production, and may also poll ATS machines in response to specific requests by APIS 22.

CAPS 40 also communicates with the ATS machines $44_1$–$44_N$, $48_1$–$48_K$ at the request of APIS 22 for the purpose of obtaining new box numbers and security codes to provide to advertisers and to cancel boxes whose end date has occurred. More particularly, APIS 22 stores one or more "box pools" (FIG. 4) for each of the vendor's clients, with each box pool including a list of box numbers and corresponding security codes available to the client's advertisers. APIS 22 includes a box management program executed on the processor 26 by which the box pools are replenished and boxes are canceled, as described in conjunction with FIGS. 5 and 5A.

The vendor network 14 may be further coupled to the Internet. To this end, a Personals On-line Network Server (PONS) 54 is coupled to a T1 line 56 to the Internet, typically via a firewall 58 and a router 60, as shown. Personal ads placed via the call centers $16_1$–$16_t$ may be posted on a client's web site via the server 54 through corresponding communication link 52. Alternatively, personal ads may be posted directly onto the Internet. Further, responses to personals accessible via the Internet may be in the form of e-mail responses over the Internet. The PONS 54 is described in a U.S. patent application entitled "Interactive Personals Online Network Method and Apparatus" which is assigned to the assignee of the subject invention and filed on even date herewith and incorporated herein by reference.

One or more user machines $64_1$–$64_j$ located at the vendor's facility are coupled to the vendor network 14 for purposes of maintenance, monitoring and updating the system. Such user machines $64_1$–$64_j$ typically take the form of personal computers, such as Apple Macintosh computers. A network server 38 is likewise coupled to the vendor network 14 and manages various communications between network components, as will be described.

Figure 2:
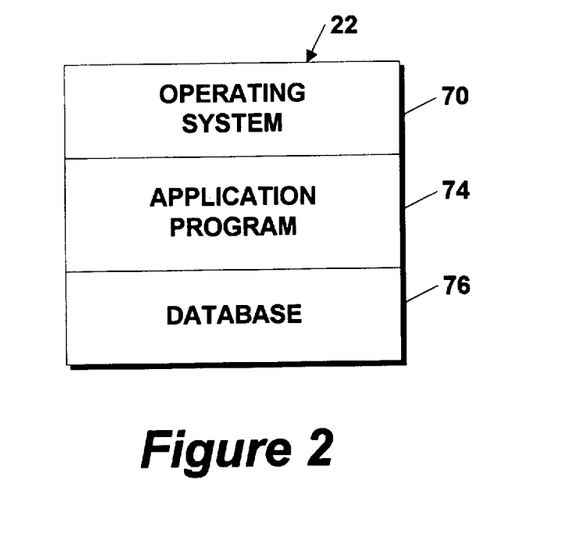
FIG. 2 is a simplified diagram of the ad taking pagination information system of FIG. 1.

Referring also to FIG. 2, the elements of APIS 22 are shown to include an operating system 70 for the processor 26 (FIG. 1) which, in the illustrative embodiment, is the Windows NT operating system of Microsoft Corporation of Redmond, Wash. Also provided in APIS is an application program 74 for execution on the processor 26, by which the APIS functionality described herein is achieved. In the illustrative embodiment, the application program 74 is written in the Dexterity software language of Great Plains of Fargo, N. Dak. A database 76 is stored in the APIS memory 28 (FIG. 1) and, in the illustrative embodiment, the database 76 is implemented with a software package from Faircom Corporation of Columbia, Mo.

Figure 3:
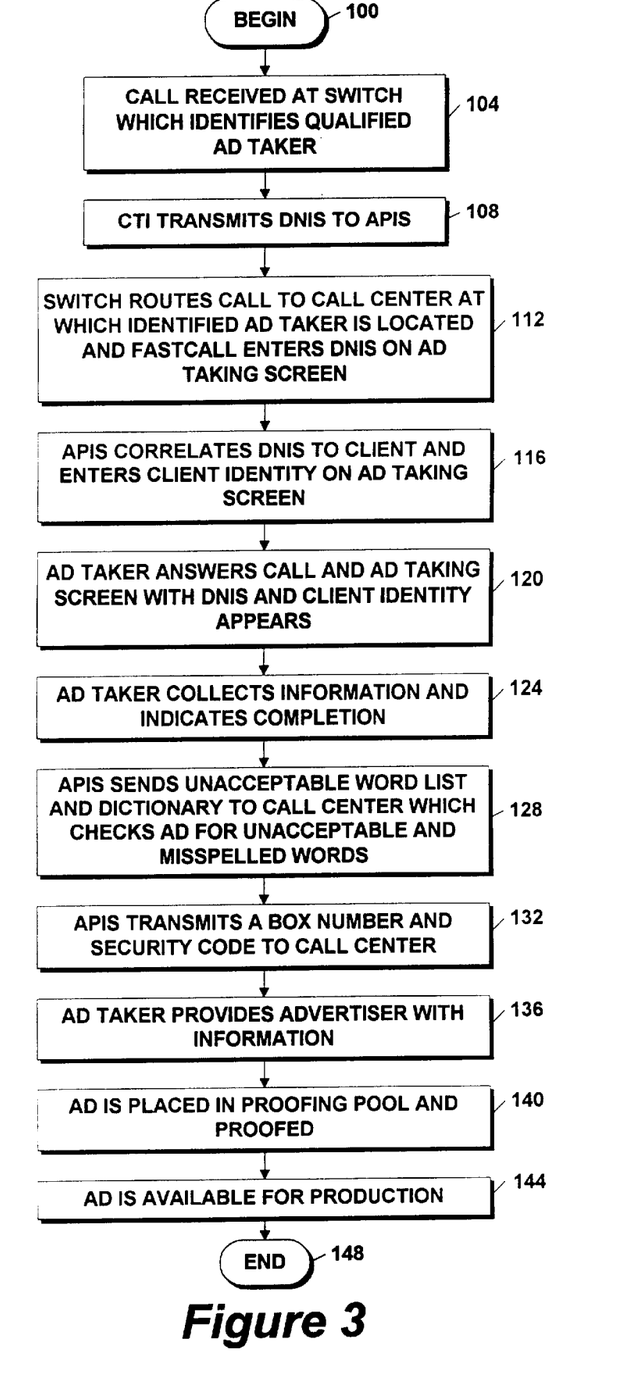
FIG. 3 is a flow diagram illustrating a method by which a personal ad is placed on the network of FIG. 1.

Referring to FIG. 3, the operation of the vendor network 14 in receiving a personal ad and making the ad available for production is illustrated. It will be appreciated by those of ordinary skill in the art that the sequence of steps set forth in the flow diagrams contained herein is illustrative only and, in many cases, may be varied without departing from the spirit of the invention.

The process commences in step 100, following which a telephone call is received at the switch 30 in step 104. In the illustrative embodiment, ads are place by making toll free or "800" calls to the switch 30, with one or more toll free numbers generally provided in the client publication. In many instances, a client provides several "800" numbers to be used in different circumstances (e.g., one "800" number for calls from Spanish speaking advertisers, etc.).

Once a call is received at the switch 30, the Dial Number Information Service (DNIS) number of the "800" number, which is unique to the number called, is extracted and used to identify a qualified ad taker. The switch 30 includes a memory table which correlates the skill set of each ad taker at each of the call centers $16_1$–$16_t$ (e.g., whether the ad taker speaks a foreign language, whether the ad taker has been specially trained to take ads from a particular client, etc.) based on login information provided by the ad takers to DNIS numbers. Based on the DNIS number of the incoming call, the switch 30 matches an incoming call to a qualified ad taker at one of the call centers $16_1$–$16_t$ in step 104.

In step 108, the DNIS number transmitted to the CTI 12 is routed to APIS 22. The switch 30 routes the call to the identified call center in step 112. Also in step 112, the Fastcall system 34 enters the DNIS number of the call on the ad taking screen(s) of the identified call center computer.

The APIS database 76 includes a memory table which correlates DNIS numbers to clients. In step 116, APIS 22 accesses the table and retrieves the identity of the client associated with the received call. Further, the client identity is transmitted from APIS 22 to the identified call center $16_1$–$16_t$ for automatic entry onto the ad taking screen(s). In step 120, the identified ad taker answers the received call and preferably, substantially simultaneously, an ad taking screen with the client identity entered appears on the call center computer.

During subsequent step 124, the ad taker collects information from the advertiser, such as information regarding the caller's identity, the category of ad the caller wishes to place and the actual text of the ad. It may also be desirable to have the ad taker collect certain survey information, based on questions generated by the vendor and/or client. Once the information is collected by the ad taker, the ad taker indicates completion, such as by a predetermined key stroke. APIS 22 responds to the indication of call completion by transmitting two files to the call center in step 128. Specifically, an unacceptable word list file and a dictionary file are sent to the call center, where the ad is checked for unacceptable and misspelled words. In step 132, APIS 22 retrieves a box number and a security code from a box pool associated with the client and stored in the APIS database 76 and transmits the box number and security code to the call center. In step 136, the ad taker conveys to the advertiser the box number and security code with which the advertiser can access voice recorded responses.

The ad taker also conveys to the advertiser a telephone number of the ATS machine servicing the client for the advertiser to call to record a voice greeting which respondents to the ad will hear. When the advertiser calls into the ATS machine, he is prompted by an automated voice recording to provide answers via telephone keypad actuation to certain questions about himself and/or the person sought. As will become apparent, the information entered by the advertiser is used to generate a list of parameters that pertain to the ad.

In step 140, the personal ad is transmitted from the call center $16_1$–$16_t$ to APIS 22 where it is marked as not having been proof read and stored in the database 76. Once the ad is proof read, the ad is available for production in step 144, following which the process terminates in step 148.

Figure 4:
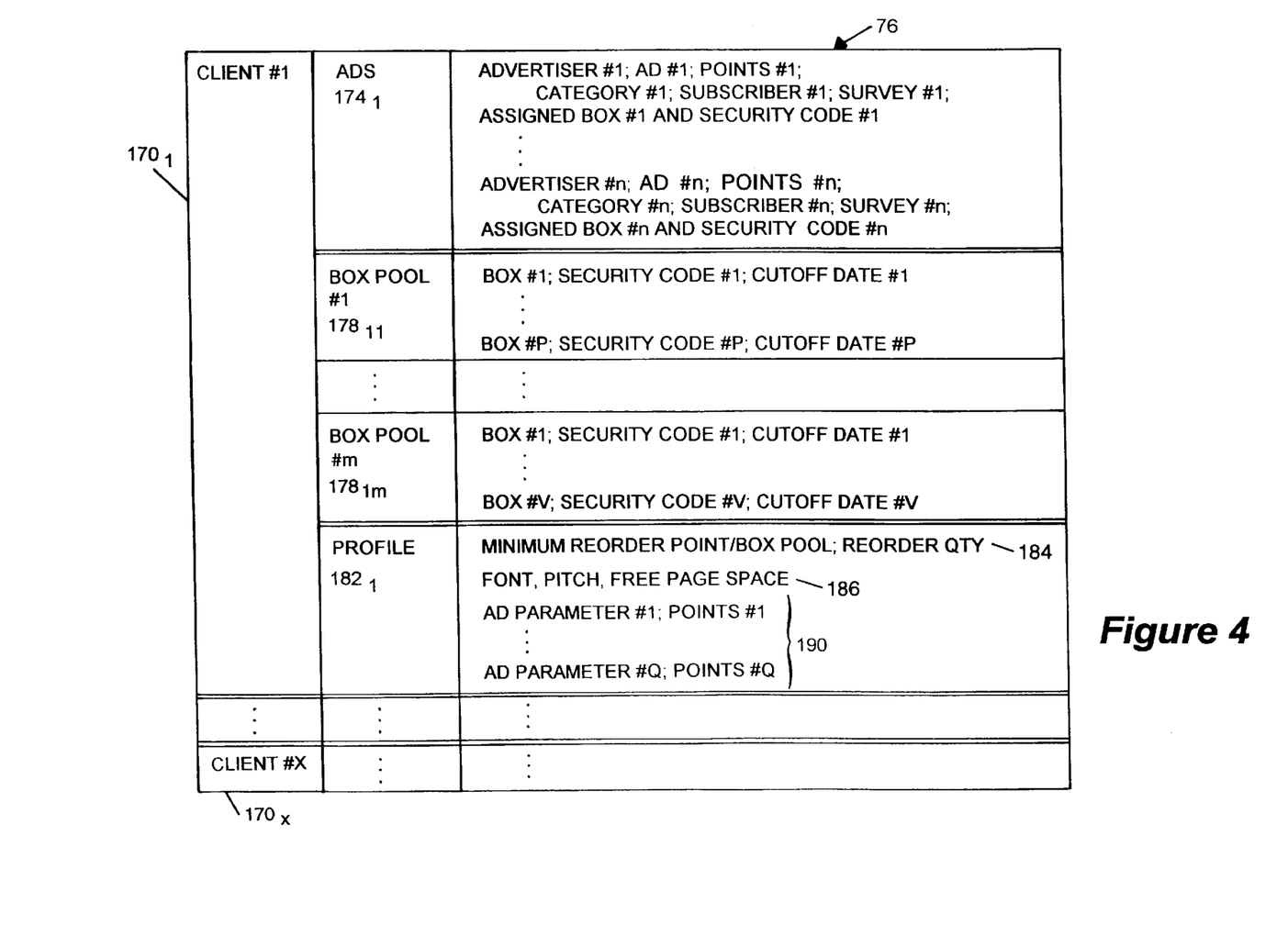
FIG. 4 illustrates the structure of a portion of the database of the ad taking pagination information system of FIG. 1.

Referring to FIG. 4, a portion of the APIS database 76 is shown to include information stored for each of the vendor's clients (i.e., client #1, . . . client #x). While database content is shown in detail for client #1, the same type of information is stored for each of the clients. For each client, the database 76 contains a field 170 in which an identifier of the particular client is stored. Thus, in the case where the vendor has "x" clients, "x" such client identifying fields $170_1$–$170_x$ are stored. In the illustrative embodiment, the client identifier field contains a number, such as a seven digit number, identifying the respective client.

Associated with each client field $170_1$–$170_x$ are: an ad sector $174_1$–$174_x$ (referred to generally as ad sector 174), a box pool sector $178_1$–$178_x$ (referred to generally as box pool sector 178), and a profile sector $182_1$–$182_x$ (referred to generally as profile sector 182). The ad sector 174 contains entries for each ad placed for publication by the client, including an identifier of the advertiser (i.e., advertiser#1, advertiser#n) and the text of the ad (ad#1, . . . ad#n). The advertiser's identifier field typically includes the advertiser's name, address, telephone number and e-mail address (if any).

Also stored in the ad sector 174 for each ad placed is a point total (i.e., points#1, . . . points#n), an ad category (i.e., ad category#1, . . . ad category#n), a subscriber field (i.e., subscriber#1, . . . subscriber#n), a survey results field (survey#1, . . . survey#n), an assigned box number and security code (i.e., assigned box#1 and security code#1, . . . assigned box#n and security code#n). The point total associated with an ad is a value that is computed during production which provides a measure of the expected effectiveness of the particular ad in eliciting responses, as discussed below. Suffice it to say that each parameter of an ad (e.g., smoker, college graduate, etc.) is assigned a point value and the point total of the ad is equal to the sum of the points assigned to each applicable ad parameter. The point total is used to order the ads for production in a manner described below in conjunction with FIGS. 7 and 7A.

The ad category identifies the ad as belonging to a particular category of ad run by the client in terms of the principle designation of the ad. As one example, a client may run two categories of ads, male seeking female and female seeking male. The subscriber field identifies whether or not the advertiser is a subscriber to the client's publication and the survey results field is provided for storing the advertiser's answers to any survey questions asked by the ad taker. The assigned box number and security code refer to the box number and security code assigned to the advertiser for retrieval of responses to the ad stored on one of the ATS machines.

The box pool sector 178 contains one or more box pools associated with the respective client. For example, in the illustrative embodiment, client #1 has "m" box pools labeled $178_{11}$–$178_{1m}$, as shown. A client that prints personal ads in different editions of a publication may have a different box pool for each such edition, for example.

Each box pool includes a listing of box numbers and security codes available on the ATS machine where responses to ads published by the client are stored. Also stored in association with each available box number/ security code combination is a cutoff date (i.e., cutoff date#1, . . . cutoff date#p) which indicates the date on which the box is no longer available (i.e., the last day that the box can be given to an advertiser). In the illustrative embodiment, a box number consists of a four digit number and a security code is a six digit number.

Also maintained in the database 76 for each client is a client profile 182. The profile contains various information unique to the client which is used in production. More particularly, the profile 182 includes a field 186 containing a description of various attributes associated with text to be produced for the client based on specifications provided by the client and attributes of the client publication. As examples, this field 186 contains information regarding the font and pitch of the text characters in which personal ads will be published by the client and the amount of free page space that the client has allocated for printing personal ads.

The profile 182 further includes a field 184 in which is stored a first value corresponding to the minimum number of available boxes which should be kept in reserve for ads placed for that client (i.e., a minimum reorder point/box pool) and a second value corresponding to a quantity of boxes and security codes to be ordered any time it is determined that the number of available boxes is less than the minimum reorder point (i.e., reorder quantity). The process by which APIS 22 ensures that the minimum number of available boxes are maintained for each client is described in conjunction with FIGS. 5 and 5A.

Additional fields 190 of the profile 182 contain a listing of each parameter of ads published by the client and, associated with each such parameter, a weight or number of points (i.e., points#1, . . . points#Q). The listed ad parameters include characteristics of the individual sought in the ad, characteristics of the ad placed and may further include characteristics of the advertiser. Examples of ad parameters pertaining to characteristics of the individual sought are smoker, drinker, college graduate, etc. and an example of an ad parameter pertaining to a characteristic of the ad placed is whether or not the advertiser has recorded a voice greeting.

The points associated with each such parameter represent the effectiveness of that particular ad parameter in eliciting responses. For example, ads published by client#1 in which non-smokers are sought may be twice as likely to elicit responses as ads seeking smokers. In this case, the parameter non-smoker will be assigned twice as many points as the smoker parameter. The parameter points are used to tally a point total for each ad by which the ads are ordered during production.

The number of points associated with each ad parameter in the client's profile 182 is initially determined by a vendor account executive, generally, based on his or her experience. In accordance with a technique described in conjunction with FIG. 6, the client's profile 182 is periodically evaluated against certain statistical information accumulated by CAPS 40 from one or more of the ATS machines $44_1$–$44_N$ and $48_1$–$48_K$ via the network 10 in order to verify that the points assigned to each ad parameter accurately reflect the effect of that parameter in eliciting a response.

Figure 5:
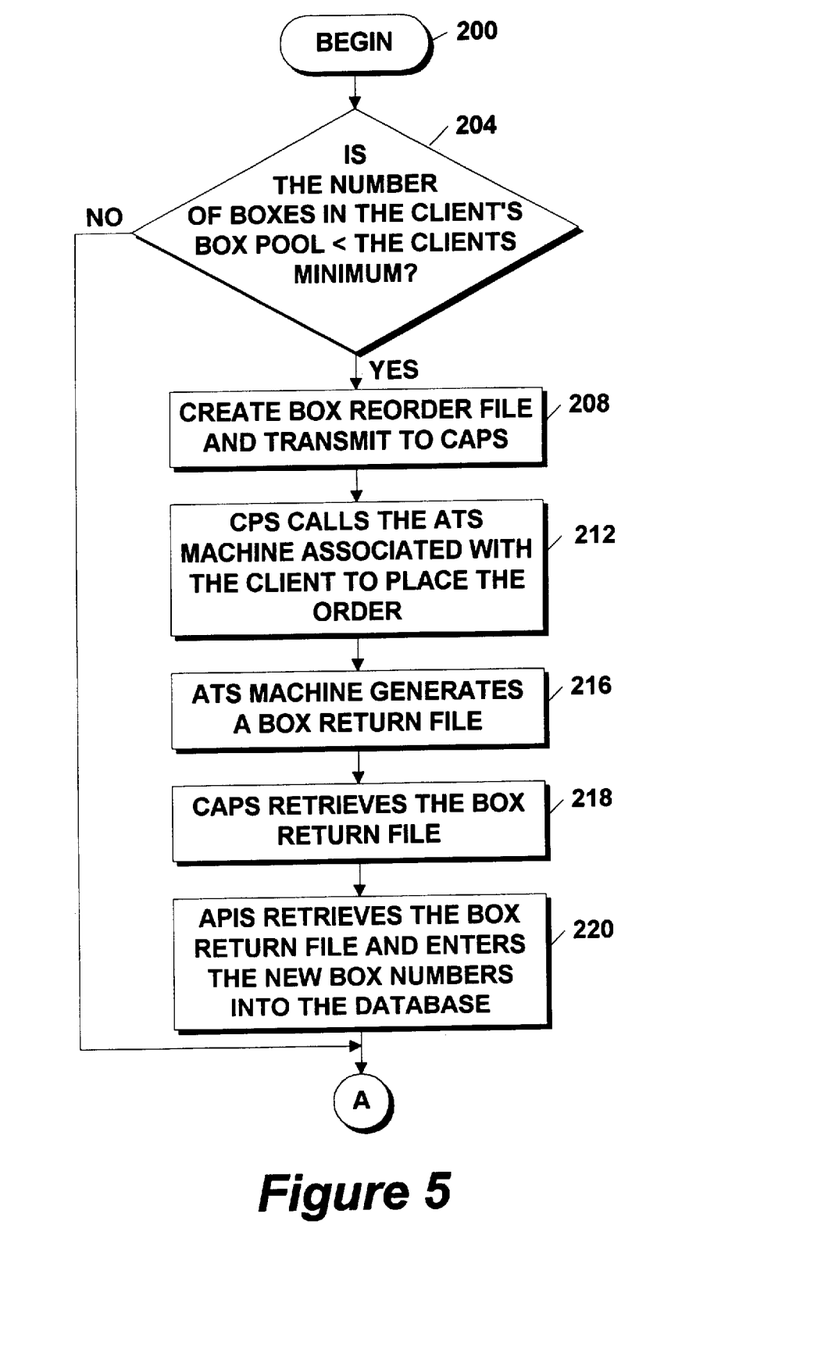
FIG. 5 is a first portion of a flow diagram illustrating a box management process according to the invention.
Figure 5A:
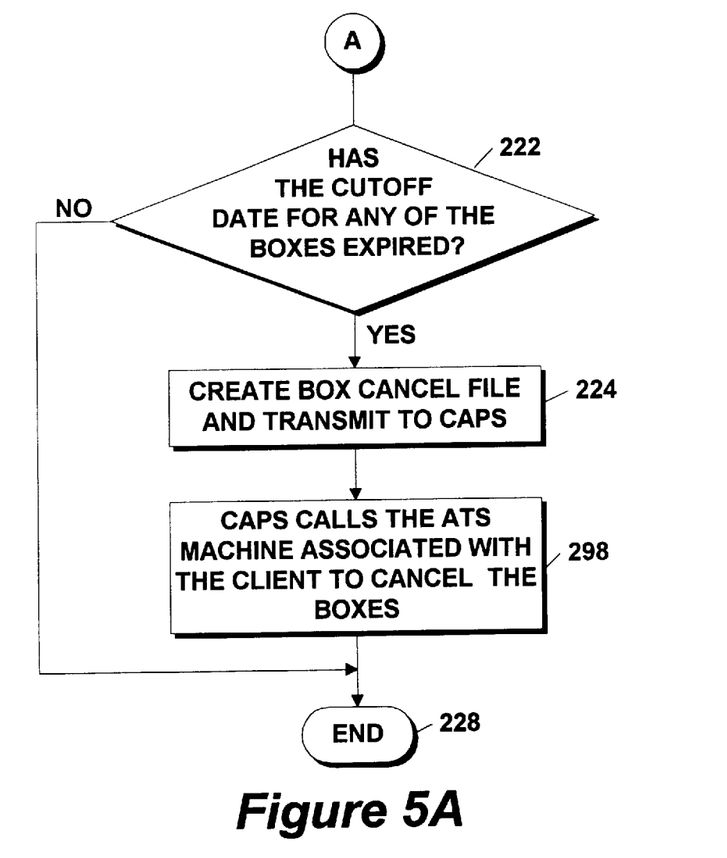
FIG. 5A is a second portion of the flow diagram of FIG. 5.

Referring also to FIGS. 5 and 5A, the manner by which the APIS program 74 (FIG. 2) maintains a predetermined number of boxes and security codes available for ads placed for publication by each client will be described. In the illustrative embodiment, the process of FIGS. 5 and 5A is performed periodically for each box pool, such as every five minutes. Where a plurality of box pools are stored for a client, the process is repeated for each box pool associated with the client.

The process commences in step 200, following which it is determined in step 204 whether the number of boxes (i.e., the number of box numbers and security codes) contained in the considered box pool is less than the minimum reorder point specified in field 184 of the client's profile 182. If the number of available boxes in the box pool is greater than or equal to the minimum reorder point specified in the client's profile, then step 222 (FIG. 5A) is next performed. Alternatively, step 208 is next performed in which the APIS program 74 causes a box reorder file to be generated and transmitted to CAPS 40. The reorder file is a request for additional box number/security code combinations to replenish the client's box pool in the database 76.

In the illustrative embodiment, the reorder file is an ASCII file named "ClientID.ord", where the ClientID is the seven digit number identifying the client. The reorder file includes a four character Machine ID identifying the ATS machine from which boxes are requested, a Record type (1=box order, 2=box cancel), a four digit Program Number which identifies a program to be run by the ATS machine in accumulating new boxes and also identifies a particular database of the ATS machine in which the advertiser's responses will be stored, the Deadline day which refers to the last day that ads may be placed for a given production run, the Publish days from deadline which specifies the number of days between the Deadline day and the day that the client publishes ads, the Days to expire which specifies the duration of availability of the requested boxes and the Number of boxes ordered.

APIS 22 places the box reorder file in a predetermined directory on the network server 38. CAPS 40 periodically polls the server 38 for box reorder files and processes a reorder file by calling the ATS machine identified in the file and transmitting to the called ATS machine contents of the box reorder file in step 212. The ATS machine responds to the request by creating a box return file containing a list of box numbers and security codes in step 216. In the illustrative embodiment, the box return file is named "ClientID.box", where the ClientID is the seven digit number identifying the client, and, for each box ordered, includes the Program number, the Appears date which indicates when the box becomes available, the Expire date which indicates when the box expires, the Cutoff date which indicates the last day that ads for the client may be placed, the four digit box number, and the six digit security code.

The ATS machine places the box return file into a predetermined directory which is periodically polled by CAPS 40. In step 218, the retrieved box return file into a predetermined directory on the network server 38 which is periodically polled by APIS 22. In step 220, APIS 22 retrieves the box return file and enters the new box numbers and security codes into the database 76.

Thereafter, it is determined in step 222 whether the cutoff date associated with any of the boxes stored in the box pool has expired. In the event that none of the cutoff dates have expired, the box management process is thereafter terminated in step 228. Alternatively, APIS 22 generates a box cancel file in step 224. In the illustrative embodiment, the format of the box cancel file is identical to the box reorder file, with the exception that the suffix in the file name is ".CAN" and the record type field contains the value "2" in the case of a box cancel file. The box cancel file is transmitted to CAPS in step 224 in the same manner as a box reorder file. In step 226, CAPS calls the ATS machine identified in the box cancel file and causes the listed boxes to be canceled (i.e., made available for future use), following which the process terminates in step 228.

With the box management technique described in FIGS. 5 and 5A, an effective system is provided for ensuring that a predetermined minimum number of boxes remain available for new personal ads placed for publication by each client. The technique is a function of actual box usage, as contrasted to an estimate of the number of ads that will be placed in a given time for each client, thereby enhancing the effectiveness of box management. Further, with this technique, monitoring of the number of available boxes by vendor personnel and errors associated with transcribing box numbers and security codes are eliminated.

Figure 6:
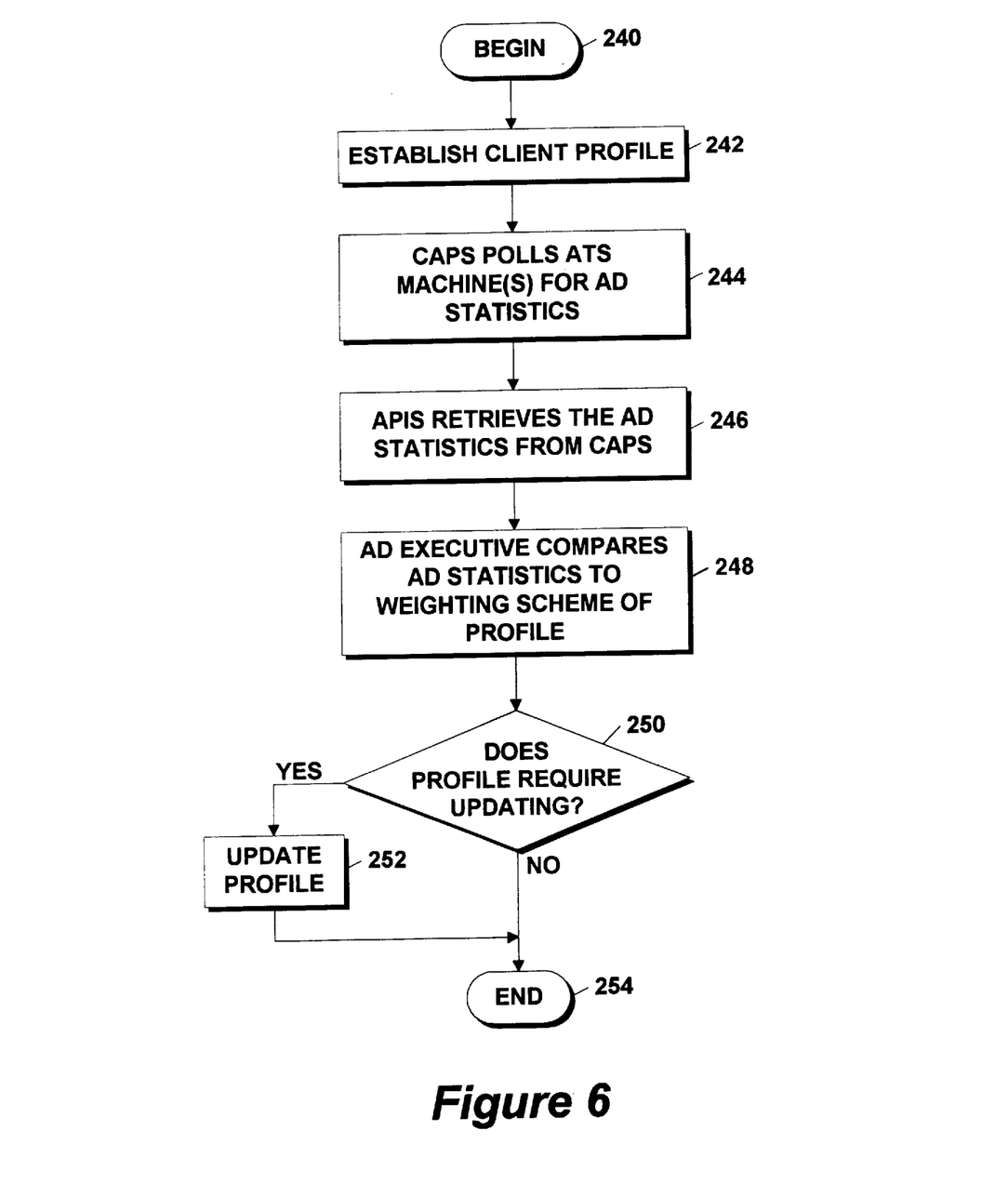
FIG. 6 is a flow diagram illustrating a method by which a client profile is verified.

Referring to FIG. 6, an illustrative method for verifying a client profile 182 commences at step 240, with the profile being generated and entered into the database 76 in step 242. The content of client profile is described in conjunction with FIG. 4 and is initially generated by a vendor account executive based on discussions with the client and the executive's experience. The profile verification process of FIG. 6 may be performed periodically, such as prior to each production run.

In step 244, CAPS 40 polls one or more ATS machines $44_1$–$44_N$, $48_1$–$48_K$ for statistics regarding ads recently published by the client whose profile is being verified. The polled ATS machine, or machines are those on which responses to ads run by the client are stored. The statistics file generated by the ATS machine includes information regarding each ad placed and, more specifically, a list of parameters applicable to the ad.

In the illustrative embodiment, the name of the status file includes a drive letter (i.e., identifying the drive on the ATS machine on which the information is stored) and a database number (i.e., identifying the database on the ATS machine in which the information is stored), with a suffix of ".STA". The first line of the file includes information about the ATS database associated with the client and each line thereafter corresponds to, and contains information regarding a particular ad placed for publication by the client. One illustrative format for the ad related lines of the status file is given in the following Table:

| | | |
|---|---|---|
| 1. | String | Box number (four digit number) |
| 2. | Integer | Box state (e.g., greeting recorded, approved, etc.) |
| 3. | Integer | Area Code (of advertiser) |
| 4. | Integer | Preference (i.e., ad category) |
| 5. | Integer | Profile (value is calculated based on the advertiser's answers to multiple choice questions) |
| 6. | Integer | Age & Interest (value is calculated based on the advertiser's answers to multiple choice questions) |
| 7. | Integer | Expiration date (end date of the box) |
| 8. | String | Security code (six digit number) |
| 9. | Integer | Greeting state (whether a greeting has been recorded) |
| 10. | Integer | Instant ad flag (whether a respondent used this feature to place an ad) |
| 11. | Integer | Interview flag (whether the advertiser used this interactive greeting recording feature to record a greeting) |
| 12. | Integer | Number of messages received |
| 13. | Integer | Number of logins to the box |
| 14. | Integer | Number of times played directly |
| 15. | Integer | Number of times browsed |
| 16. | Integer | Astrology profile played count |
| 17. | Integer | Astrology response count |
| 18. | String | Astrology birthday & flag |

As noted above, CAPS 40 polls the remote ATS machines $44_1$–$44_N$ at predetermined times (i.e., scheduled polling) to obtain a statistics file and the local ATS machines $48_1$–$48_K$ provide a statistics file at the same predetermined times, such as based on the timing of production. As one example, such scheduled polling occurs each week at midnight Sunday and the results of the polling (i.e., statistics files) are made available to APIS 22 for retrieval and use in production runs performed each Monday morning. The manner by which CAPS 40 polls ATS machines is described in a U.S. patent application entitled "Centralized Audiotext Polling System" which is assigned to the Assignee of the present invention and filed on even date herewith and incorporated herein by reference.

In step 246, APIS 22 retrieves the statistics file from CAPS 40 and in step 248, an account executive compares the retrieved statistical information to the client's profile to determine whether the profile requires updating. There are various ways that the account executive may use information contained in the statistics file to verify a client's profile. As one example, the statistics file is placed into a spreadsheet which is then used to process the information, for example, by counting the number of ads to which various parameters pertain. The number of points stored in the profile 182 for each parameter can then be compared to the number of responses received per ad parameter as indicated by the processed statistics. In this way, a determination is made as to whether the weight assigned to each ad parameter is consistent with the results of the published ads.

For example, consider the case where the statistics obtained from the ATS machine through CAPS 40 indicate that, of the ads reported on, ads seeking smokers elicited 200 responses during the considered time frame and ads seeking non-smokers elicited only 100 responses during the same time. Also assume that the client's profile assigns a weight of 10 to the smoker parameter and a weight of 5 to the non-smoker parameter. In this case, it is apparent to the account executive that the ratio of ads run with these parameters is optimum in view of the statistics accumulated. Thus, it is determined in step 250 that the client's profile does not require updating and the process is subsequently terminated in step 254. However, consider the case where the client's profile assigns two points to the smoker parameter and 10 points to the non-smoker parameter. In this case, a mismatch exists between the profile, which favors the non-smoker parameter over the smoker parameter by a ratio of 5:1, and the statistics which indicate that the smoker parameter is twice as likely to elicit a response as the non-smoker parameter. In response to such a mismatch, the account executive determines in step 250 that the profile requires updating and modifies the profile accordingly in step 252, following which the process is terminated.

With this arrangement, the client's profile is verified to ensure that the order in which personal ads are provided to the client is the most productive. In this way, the efficiency of the system in providing productive ads to clients is enhanced.

Figure 7:
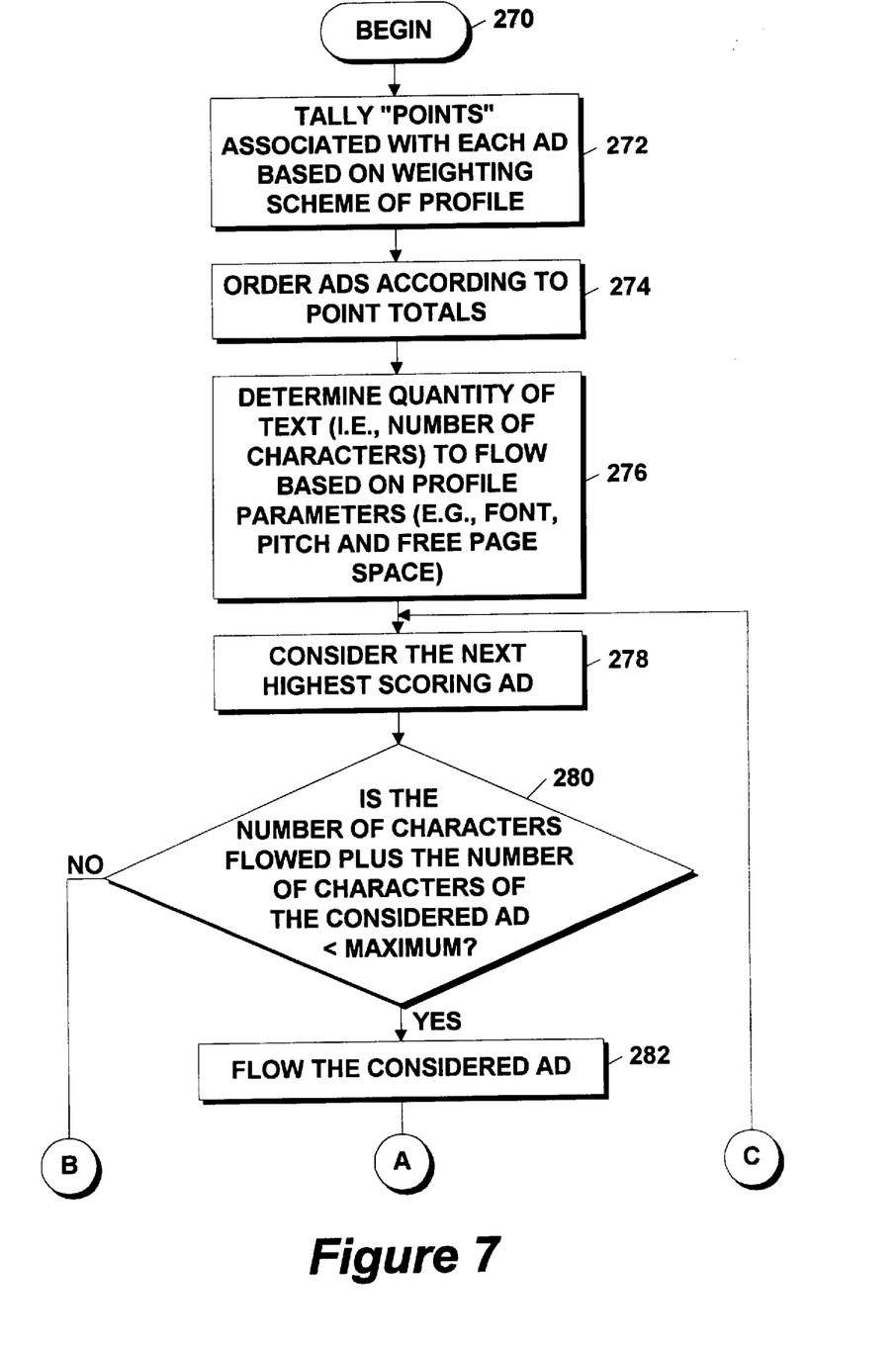
FIG. 7 is a first portion of a flow diagram illustrating a method of personal ad text production.
Figure 7A:
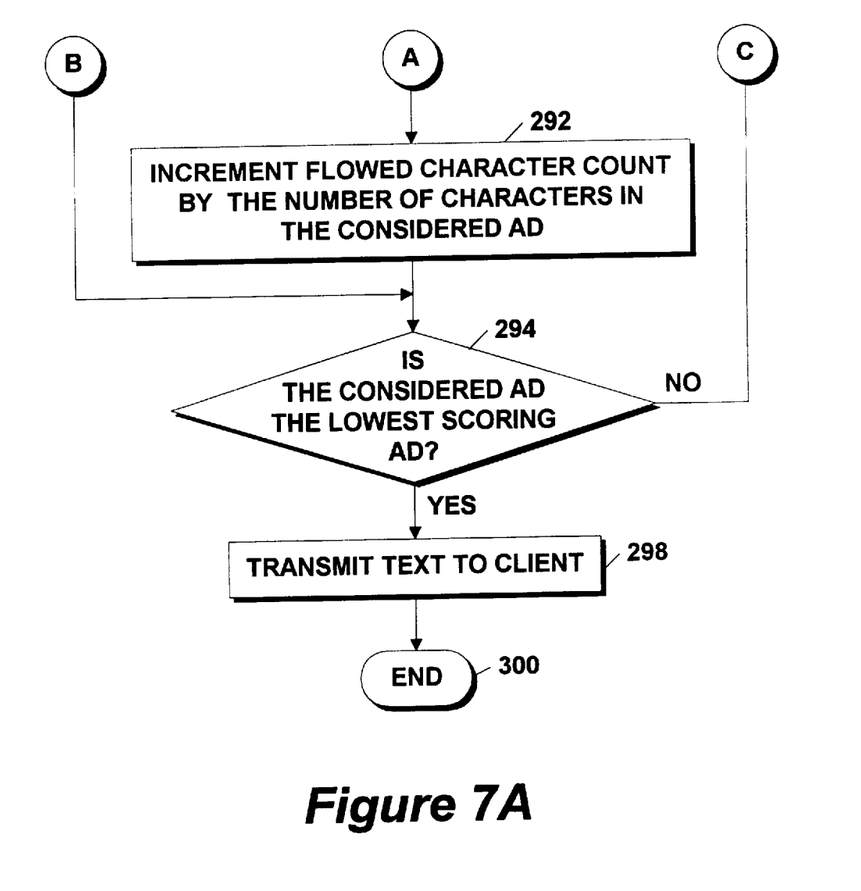
FIG. 7A is a second portion of the flow diagram of FIG. 7.

Referring to FIGS. 7 and 7A, a method is illustrated for producing personal ad text for a "camera ready" client, who enlists the assistance of the vendor to order the personals in the most effective way and provide the text in its final form ready to print in the client publication. The process commences in step 270, following which the total number of points associated with each ad stored for the client is computed in step 272. More particularly, points are allotted based on the weighting scheme stored in client's profile 182 (FIG. 4), with a predetermined number of points being assigned to each ad parameter. For example, consider a profile in which the ad parameter of "greeting recorded" (indicating that the advertiser has recorded a personal greeting) is allotted 10 points, non-smoker is allotted 8 points, college graduate is allotted 5 points and smoker is allotted 4 points. Thus, an ad seeking a non-smoking, college graduate has a point total of 13, whereas an ad seeking a smoker and for which a personal greeting has been recorded by the advertiser has a point total of 14, etc. Thereafter, in step 274, the ads stored for the client are assigned an order based on descending point totals. Stated differently, the ads are sorted by point total.

In step 276, the quantity of text to be flowed during the production run (i.e., to be transmitted to the client) is determined. Attributes associated with the client and contained in the client's profile are used to determine the quantity of text (i.e., number of ads) to flow. In the illustrative embodiment, the client attributes used to determine the number of ads to flow include the font and pitch of the characters, as well as the free page space available for the ads. The result of the determination of step 276 is a maximum number of characters that can fit in the space that the client has allocated for personal ads.

Subsequently, beginning in step 278, the next highest scoring ad (i.e., the ad having the greatest point total) is considered. Thus, during the first iteration of the process of FIGS. 7 and 7A, the highest scoring ad is considered and during subsequent iterations, the next highest scoring ad (as compared to the previously considered ad) is considered. In step 280, it is determined whether the total number of characters flowed during the production run (which is zero during the first iteration of the process) plus the number of characters of the considered ad is less than the maximum number of characters determined in step 276. If this sum is less than the maximum, then the considered ad is run in step 282. Alternatively, step 294 (FIG. 7A) is next performed.

Consider first the case where the sum of the number of characters flowed during the production run and the number of characters of the considered ad is less than the maximum. In this case, the considered ad is flowed in step 282, following which a count of the number of flowed characters is incremented by the number of characters in the considered ad in step 292. Alternatively, if the sum of the number of characters flowed during the production run and the number of characters of the considered ad is not less than the maximum, then step 294 is performed after step 280.

In step 294, it is determined whether the considered ad is the lowest scoring ad (i.e., whether all of the ads have been considered, since the ads are considered in descending order of point totals). In the event that the considered ad is not the lowest scoring ad, then the above-described process is repeated from step 278, as shown. Alternatively, if the lowest scoring ad has been considered, then the text is transmitted to the client in step 298, following which the process terminates in step 300. As examples, the text may be delivered in the form of a hard copy, on a computer diskette or may be downloaded to the client or to a client's web site via the Internet.

With the above-described production process, the correct amount of text for printing in the client publication is advantageously provided and the provided ads are ordered in a manner that meets the client's profile. That is, the ads are ordered based on their likelihood of eliciting responses.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A network on which personal ads are stored for distribution to a client, comprising:
   at least one call center on which are entered a plurality of personal ads to be distributed to the client;
   at least one ad response machine on which responses to the personal ads are stored; and
   an ad taking system comprising a database including:
   an identifier of the client;
   the plurality of personal ads to be distributed to the client; and
   a profile of the client containing a plurality of identifiers of personal ad parameters and a plurality of weights, each one associated with a corresponding one of the plurality of personal ad parameters, wherein the plurality of weights are verified with statistics regarding the productivity of the respective personal ad parameter in eliciting responses, and wherein the statistics are obtained from the at least one ad response machine over the network.

2. The network of claim 1 wherein the profile further comprises an identifier of a font and a pitch of text characters for the personal ads distributed to the client and free page space allocated by the client for the personal ad.

3. The network of claim 1 further comprising a Centralized Automated Polling System (CAPS) coupled between the network and the at least one ad response machine, wherein the CAPS periodically polls the at least one ad response machine for the statistics and makes the statistics available to the ad taking system.

4. The network of claim 1 further comprising a processor for ordering the personal ads according to the weights contained in the profile.

5. The network of claim 1 wherein personal ads are stored in the database for distribution to a plurality of clients and wherein the database contains an identifier of each of the clients, personal ads to be distributed to each of the clients and a profile of each of the clients.

6. The network of claim 5 further comprising a plurality of ad response machines, each one located proximal to at least one of the plurality of clients.

7. The network of claim 1 wherein the responses stored on the at least one ad response machine are recorded voice messages which are telephone accessible with a box number and a security code and wherein the ad taking system further comprises a processor on which a box management program is executed for maintaining a predetermined number of box numbers and security codes available for the client.

8. A method of providing text of personal ads to a client, comprising the steps of:
   receiving the text of a plurality of personal ads to be distributed to the client, the text being received at a call center coupled to a network;
   storing responses to the personal ads on an ad response machine coupled to the network;
   providing a database on an ad taking system coupled to the network, with the database including an identifier of the client, the personal ads to be distributed to the client and a profile of the client, the profile containing a plurality of identifiers of personal ad parameters and a plurality of weights, each one associated with a corresponding one of the plurality of personal ad parameters; and
   collecting from the ad response machine via the network statistics regarding the productivity of each of the plurality of personal ad parameters in eliciting responses, wherein the weights are verified with the collected statistics.

9. The method of claim 8 wherein the database providing step includes storing in the database an identifier of a font and pitch for the text of the personal ads and free page space allocated by the client for the personal ads.

10. The method of claim 8 wherein the statistics collecting step includes periodically polling the ad response machine to collect the statistics.

11. The method of claim 8 further comprising the step of distributing the text of the personal ads to the client in an order determined by the weights contained in the profile.

12. The method of claim 8 wherein the personal ad receiving step includes receiving personal ads for a plurality of clients and wherein the database providing step includes storing in the database an identifier of each of the clients, personal ads for distribution to each of the clients and a profile of each of the clients.

13. A method of providing text of personal ads to a client, comprising the steps of:

calculating a point total to assign to each of the personal ads in accordance with a weighting scheme associated with the client;

ordering the personal ads according to the point total calculated for each of the personal ads;

determining a maximum quantity of text to provide to the client based on a profile of the client; and providing the text of the personal ads to the client in accordance with the determined maximum text quantity and point totals of the personal ads.

14. The method of claim 13 wherein the maximum text quantity determining step includes determining a maximum number of text characters to provide to the client and the personal ad providing step includes the steps of:

determining whether the sum of the number of text characters previously provided to the client plus the number of characters of the personal ad having the next highest point total is less than the maximum number of text characters; and providing to the client the personal ad having the next highest point total if the sum of the number of characters previously provided to the client plus the number of characters of the personal ad having the next highest point total is less than the maximum number of text characters.

15. The method of claim 13 wherein the personal ad providing step includes transmitting the text of the personal ads to the client.

16. The method of claim 13 wherein the profile includes a font and a pitch of the text characters of the personal ads and free page space allocated by the client for the personal ads.

17. A network on which personal ads are placed for distribution to at least one client comprising:

a call center on which a plurality of personal ads to be distributed to the client are entered;

an ad response machine comprising voice recording media for storing responses to the personal ads; and an ad taking system coupled to the network and including a processor and a database, wherein the database contains a box pool in which is stored a plurality of box numbers, each one corresponding to a portion of the voice recording media of the ad response machine and a plurality of security codes by which authorized access to the voice recording media is verified, wherein the processor is operative to ensure that a predetermined minimum number of box numbers and security codes are stored in the database for the at least one client, wherein the database further includes a value representing the predetermined minimum number of box numbers and security codes to be stored for the respective client.

18. The network of claim 17 wherein the database further includes a value representing the number of box numbers and security codes to be ordered whenever the number of stored box numbers and security codes for the respective client is less than the predetermined minimum number.

* * * * *